3,065,146
PROCESS FOR PREPARING 9α-HYDROXY
STEROIDS
Charles John Sih, New Brunswick, and Frank L. Weisenborn, Middlebush, N.J., assignors to Olin Mathieson Chemical Corporation, New York, N.Y., a corporation of Virginia
No Drawing. Filed Mar. 29, 1960, Ser. No. 18,252
5 Claims. (Cl. 195—51)

This invention relates to the provision of an improved process for preparing 9α-hydroxy steroids by the enzymatic oxidation of steroids which are unsubstituted in the 9-position; and to a novel method for chemically converting 9α-hydroxy steroids to the corresponding 9(11)-dehydro steroids which latter are useful intermediates in the preparation of the known physiologically active 9α-halo-11β-hydroxy steroids.

It is an object of this invention to provide an efficient method for obtaining 9α-hydroxy steroids. More particularly, it is an object of this invention to convert 9-unsubstituted steroids, preferably also unsubstituted in the 11-position to the corresponding 9α-hydroxy steroids by the enzymatic oxidation of the steroidal starting material.

It is a further object to provide a novel method for the preparation of 9(11)-dehydro steroids by the chemical conversion of the corresponding 9α-hydroxy steroids.

These and other objects are accomplished in accordance with the method of this invention which comprises subjecting a 9-unsubstituted steroid, preferably void of a 11-substituent to the action of enzymes of $\Delta^1$-dehydrogenating microorganisms in the presence of a $\Delta^1$-dehydrogenation inhibitor. Surprisingly, it has been found that the combination of enzymes which normally effect $\Delta^1$-dehydrogenation with the inhibitor, results in the substitution of a 9α-hydroxyl group on the nucleus of the steroidal starting material, thereby effecting hydroxylation, where $\Delta^1$-dehydrogenation would have been expected.

The hydroxylation of this invention can be effected either by including the steroidal starting material and the $\Delta^1$-dehydrogenation inhibitor in an aerobic culture of microorganism; or by bringing together, in an aqueous medium, the steroidal substrate, air, the $\Delta^1$-dehydrogenation inhibitor and enzymes of non-proliferating cells of the microorganism.

In general, any $\Delta^1$-dehydrogenating microorganism can be employed for the 9α-hydroxylation of this invention. Among the microorganisms which are suitable can be named those of the genera, Nocardia (e.g., the dehydrogenating species of group 1 (Bergey) exemplified by *Nocardia restrictus, Nocardia corralina, Nocardia coeliaca, Nocardia globerula* and *Nocardia aurentia*); Corynebacterium (e.g., *Corynebacterium simplex* and *Corynebacterium hoagii*); Mycobaterium (e.g., *Mycobacterium rhodochrous*); Cylindrocarpon (e.g., *Cylindrocarpon radicicola*); Pseudomonas (e.g., *Pseudomonas testosteroni*) and Bacterium (e.g., *Bacterium cyclo-oxydans*).

The $\Delta^1$-dehydrogenation inhibitor useful in this invention is any substance which inhibits the action of $\Delta^1$-dehydrogenating enezymes. Thus the inhibitor may be a substance which acts to retard the transport of electrons from the steroid to be oxidized to the $\Delta^1$-dehydrogenase; or a substance which selectively inactivates the $\Delta^1$-dehydrogenase per se, thereby preventing it from exerting its dehydrogenating activity. In both cases, the surprising result obtained by the practice of this invention, is made possible by interfering with $\Delta^1$-dehydrogenation to the extent that the more reduced phosphopyridine nucleotides are available for hydroxylation. The retarders are a class of substances which hinder oxidation catalysis by iron porphyrins through attachment to the iron in the respiratory carriers such as cytochrome oxidase and haemoglobin thereby forming a coordination complex of the carrier and the retarder. A test to determine the retarding activity of a substance is to incorporate it in a system known to contain a cytochrome oxidase and then by spectrographic analysis to determine whether the oxidase has been converted to its activated form. The presence of the activated form is established by the appearance of a band at 452μ. The inactivators are a group of substances which preferentially combine with that portion of the dehydrogenase molecule which is necessary for the performance of its dehydrogenation function, thereby inactivating the dehydrogenase. A test to determine the inactivating function of a substance is to incorporate it in a system containing succinic acid and succinic dehydrogenase, and then by conventional methods as by spectrographic analysis determining whether succinic acid has been dehydrogenated to fumaric acid. The two types of inhibitors are more fully described by Work et al., The Basis of Chemotherapy, pg. 147–186 (1948).

Among the useful retarders are: hydrazine, hydrogen sulfide, carbon monoxide, ammonia, cyanide ions as provided by ionizible salts such as potassium cyanide or sodium cyanide; azide ions as provided by metal salts such as potassium azide; and hydroxylamine. Among the useful inactivators may be named antimycin, atebrin, acriflavin and quinine or its salts such as quinine sulfate.

Any steroid which is unsubstituted in the 9-position, and preferably also unsubstituted in the 11-position, may be used as a starting material for the enzymatic process of this invention. Included among the steroids which are utilizable, are androstanes (including androstenes and androstadienes), pregnanes (including allopregnanes, pregnenes and pregnadienes); and cholestanes (including cholestenes and cholestadienes). Examples of suitable androstanes are testosterone, 19-nortestosterone, androstane-3,17-dione, $\Delta^4$-androstene-3,17-dione, 17α-methyl-testosterone and 17αmethyl - androstane - 17β-ol-3-one. Among the suitable pregnanes are pregnane-21-ol-3,20-dione, 12-methylprogesterone, pregnane-3,20-dione, pregnenolone,16,17-oxidoprogesterone, $\Delta^{16}$-progesterone, 19-norprogesterone, 17α-hydroxyprogesterone, cortexolone, $\Delta^1$-cortexolone, $\Delta^1$-17α-hydroxyprogesterone, desoxycorticosterone, $\Delta^1$-desoxycorticosterone, 6α-methyl-desoxycorticosterone, $\Delta^1$-6α-methyl-desoxycorticosterone and 6α-fluorocortexolone. Particularly preferred are those steroids which contain in the A-ring the 3-keto-$\Delta^4$-configuration and are saturated in the 1,2-position.

In general the conditions for culturing the $\Delta^1$-dehydrogenating microorganisms for the purposes of this invention are, except for the inclusion of the steroid to be converted and the $\Delta^1$-dehydrogenation inhibitor, the same as those for culturing $\Delta^1$-dehydrogenating organisms for their normal function, i.e., the microorganism is aerobically grown in contact with (in or on) a suitable fermentation medium. A suitable medium essentially comprises a source of nitrogenous factors and a source of carbon and energy. The latter may be a carbohydrate (such as sucrose, molasses, glucose, maltose, starch or dextrin), a fatty acid, a fat (such as soybean oil) and/or the steroid itself. Preferably however, the medium includes an assimilable source of carbon and energy in addition to the steroid.

The source of nitrogenous factors may be organic (e.g., soybean meal, corn steep liquor, meat extract and/or distiller's solubles) or synthetic (i.e., composed of simple, synthesizable organic or inorganic compounds such as ammonium salts, alkali nitrates, amino acids or urea).

An adequate sterile-air supply should be maintained during fermentation, for example by the conventional methods of exposing a large surface of the medium to air or by utilizing submerged aerated culture. The steroid may be added to the culture during the incubation period or included in the medium prior to sterilization or inoculation. The preferred range of concentration of the steroid in the culture is about 0.01 to 0.10%. The culture period may vary considerably, the range of about 6 to 96 hours being feasible, but not limiting. The concentration of the $\Delta^1$-dehydrogenase inhibitor may vary considerably but is preferably within the range of $5 \times 10^{-4}$ M to $2 \times 10^{-3}$ M.

The process yields inter alia the 9α-hydroxy derivative of the steroidal substrate which can be converted to the corresponding 9(11)-dehydro steroid derivative. For this purpose, in accordance with another aspect of this invention, the 9α-hydroxy steroidal product is treated with an equimolar amount of thionyl chloride in the presence of an organic base (e.g., pyridine and triethylamine) thereby yielding the corresponding 9(11)-dehydro derivative, which can be purified by conventional procedures. The 9(11)-dehydro derivatives thus obtained are known to the art as starting materials for the preparation of physiologically active 9α-halo-11β-hydroxy steroids.

The following examples are presented to further illustrate this invention (all temperatures being in centigrade):

EXAMPLE 1

9α-Hydroxyprogesterone

A. Fermentation: Surface growth from a one-week old culture of *Nocardia restrictus* (Waksman Collection No. 545, Institute of Microbiology, New Brunswick, New Jersey) grown on Gould agar of the following composition:

| | |
|---|---|
| Agar _____gms__ | 20 |
| Glucose _____gms__ | 10 |
| Yeast extract_____gms__ | 2.5 |
| K$_2$HPO4 _____gm__ | 1 |
| Distilled water q.s. _____liter__ | 1 |

(Sterilized 15 minutes at 20 p.s.i.)

is suspended in 5 ml. of an 0.85% saline solution, one ml. portions of this suspension are used to inoculate each of five 250 ml. Erlenmeyer flasks (F1 stage) each containing 50 ml. of the following medium (Corn Steep Medium):

| | |
|---|---|
| Corn steep liquor_____gms__ | 6 |
| NH$_4$H$_2$PO4 _____gms__ | 3 |
| CaCO$_3$ _____gms__ | 2.5 |
| Soybean oil _____gms__ | 2.2 |
| Yeast extract_____gms__ | 2.5 |
| Dextrose _____gms__ | 10 |
| Distilled water q.s. _____liter__ | 1 | pH 7.0 (Sterilized for 15 minutes at 30 p.s.i.)

The flasks are incubated at 25° on a rotary shaker (200 cycles/min., 2" radius) for 72 hours, after which a 3% by volume transfer is made to each of twenty 500 ml. Erlenmeyer flasks (F2 stage) containing 100 ml. of the medium used in the F1 stage. The F2 stage flasks are incubated for 48 hours and then simultaneously supplemented by the addition of 0.25 ml./flask of a solution containing 200 mgs. of progesterone per ml. of a 1:1 mixture of acetone and N,N-dimethylformamide, resulting in a final progesterone concentration 500γ/ml. of broth; and 0.1 ml./flask of an aqueous solution containing 30 mg./ml. of potassium cyanide, resulting in a final cyanide ion concentration of about $1.0 \times 10^{-3}$ M. The F2 stage flasks are then incubated for an additional 24 hours under the conditions used in the incubation of the F1 stage flasks.

B. Isolation: 24 hours after the addition of the steroid substrate, each flask is harvested by filtration directly through a Seitz clarifying pad, using suction. The filtrates are combined and thrice extracted with 700 ml. portions of chloroform. The combined chloroform extracts are evaporated to dryness leaving about 757 mg. of a solid residue. 200 mgs. of the residue is chromatographed on a cellulose-powder column (1.5×12 cm.) using propylene glycol as the stationary phase and methylcyclohexane and toluene as the mobile phase. 3.5 ml. fractions are collected every three minutes. Fractions 8–55 are combined, the solvent removed in vacuo, the residue taken up in chloroform and then washed twice with 50 ml. portions of water to remove traces of propylene glycol. The washed chloroform extract is dried over sodium sulfate, concentrated to dryness and the residue recrystallized from acetone-hexane, yielding about 149 mg. of 9α-hydroxyprogesterone:

M.P. about 190–191°; $[\alpha]_D + 188°$ (chloroform); $\lambda_{max.}^{EtOH}$ 242μ ($\epsilon = 15,100$); $\lambda_{max.}^{Nujol}$ 2.97μ, 5.88μ, 6.10μ, 6.22μ

Fractions 58–65 are combined and the solvent removed in vacuo leaving a residue which is dissolved in chloroform. The chloroform solution is washed with water, dried over sodium sulfate and concentrated to yield a residue which is recrystallized from acetone-hexane yielding about 30 mgs. of $\Delta^4$-androstene-3,17-dione, M.P. about 217–218°.

Similarly, except for the use of carbon monoxide in place of potassium cyanide, the procedure of Example 1 yields the product 9α-hydroxyprogesterone.

EXAMPLE 2

9α-Hydroxytestosterone

A. Fermentation: 1 ml. portions of inoculum obtained as described in Example 1 from a culture of *Bacterium cyclo-oxydans* (ATCC 12673) on Gould Agar are used to inoculate each of five 250 ml. Erlenmeyer flasks (F1 stage) each containing 50 ml. of Corn Steep Medium. The flasks are incubated at 25° on a rotary shaker (200 cycles per minute, 2 inch radius for 72 hours) after which time a 3% by volume transfer is made to each of twenty 500 ml. Erlenmeyer flasks containing 100 ml. of the medium used in the F1 stage. The flasks are incubated for 48 hours and then simultaneously supplemented by the addition of 0.25 ml. per flask of a solution containing 200 mgs. of testosterone per ml. of a 1:1 mixture of acetone and N,N-dimethylformamide resulting in a final testosterone concentration of 500 gamma per ml. of broth; and 0.1 ml. per flask of an aqueous solution containing 16 mgs. per ml. of sodium azide resulting in a final azide ion concentration of about $5 \times 10^{-4}$ M. Incubation is continued for about 24 hours under the conditions used in the incubation of the F1 stage flasks.

B. Isolation: Each flask is harvested by filtration directly through a Seitz clarifying pad using suction. The filtrates are combined and thrice extracted with 700 ml. portions of chloroform and the chloroform extracts are evaporated to dryness leaving a residue which is chromatographed on a cellulose-powder column by the procedure outlined in part B of Example 1. There is thus obtained upon recrystallization from acetone-hexane about 100 mgs. of 9α-hydroxytestosterone.

9α-hydroxy-6α-methyl-19-nortestosterone is readily prepared by following the procedure of Example 2 except for the substitution of 6α-methyl-19-nortestosterone for the testosterone material used therein.

EXAMPLE 3

9α-Hydroxycortexolone

A. Fermentation: 1 ml. portions of inoculum obtained as described in Example 1 from a culture of *Nocardia aurentia* (ATCC 12674) on Gould Agar are used to inoculate each of five 250 ml. Erlenmeyer flasks (F1 stage) each containing 50 ml. of Corn Steep Medium. The flasks are incubated at 25° on a rotary shaker (200 cycles per minute, 2 inch radius for 72 hours) after which time a 3% by volume transfer is made to each of twenty 500 ml. Erlenmeyer flasks containing 100 ml. of the medium used in the F1 stage. The flasks are incubated for 48 hours and then simultaneously supplemented by the addition of 0.25 ml. per flask of a solution containing 200 mgs. of cortexolone per ml. of 1:1 mixture of acetone and N,N-dimethylformamide resulting in a final cortexolone concentration of 500 gamma per ml. of broth; and 0.2 ml. per flask of an aqueous solution containing 16 mgs. per ml. of hydroxylamine resulting in a final hydroxyl amine concentration of about $1 \times 10^{-3}$ M. Incubation is continued for about 24 hours under the conditions used in the incubation of the F1 stage flasks.

B. Isolation: Each flask is harvested by filtration directly through a Seitz clarifying pad using suction. The filtrates are combined and thrice extracted with 700 ml. portions of chloroform and the chloroform extracts are evaporated to dryness leaving a residue which is chromatographed on a cellulose powder column by the procedure outlined in part B of Example 1. There is thus obtained upon recrystallization from acetone-hexane about 100 mgs. of 9α-hydroxycortexolone.

EXAMPLE 4

*9α-Hydroxydesoxycorticosterone*

A. Fermentation: 1 ml. portions of inoculum obtained as described in Example 1 from a culture of *Pseudomonas testosteroni* (ATCC 11,996) on Gould Agar are used to inoculate each of five 250 ml. Erlenmeyer flasks (F1 stage) each containing 50 ml. of Corn Steep Medium. The flasks are incubated at 25° on a rotary shaker (200 cycles per minute, 2 inch radius for 72 hours) after which time a 3% by volume transfer is made to each of twenty 500 ml. Erlenmeyer flasks containing 100 ml. of the medium used in the F1 stage. The flasks are incubated for 48 hours and then simultaneously supplemented by the addition of 0.25 ml. per flask of a solution containing 200 mgs. of desoxycorticosterone per ml. of 1:1 mixture of acetone and N,N-dimethylformamide resulting in a final desoxycorticosterone concentration of 500 gamma per ml. of broth; and 0.2 ml. per flask of an aqueous solution containing 510 mgs. per ml. of atebrin hydrochlorides resulting in a final hydroxyl amine concentration of about $1 \times 10^{-3}$ M. Incubation is continued for about 24 hours under the conditions used in the incubation of the F1 stage flasks.

B. Isolation: Each flask is harvested by filtration directly through a Seitz clarifying pad using suction. The filtrates are combined and thrice extracted with 700 ml. portions of chloroform and the chloroform extracts are evaporated to dryness leaving a residue which is chromatographed on a cellulose powder column by the procedure outlined in part B of Example 1. There is thus obtained upon recrystallization from acetone-hexane about 108 mgs. of 9α-hydroxydesoxycorticosterone.

EXAMPLE 5

*9α-Hydroxy-19-Norprogesterone*

A. Fermentation: 1 ml. portions of inoculum obtained as described in Example 1 from a culture of *Cylindrocarpon radicicola* (ATCC 11,011) on Gould Agar are used to inoculate each of five 250 ml. Erlenmeyer flasks (F1 stage) each containing 50 ml. of Corn Steep Medium. The flasks are incubated at 25° on a rotary shaker (200 cycles per minute, 2 inch radius for 72 hours) after which time a 3% by volume transfer is made to each of twenty 500 ml. Erlenmeyer flasks containing 100 ml. of the medium used in the F1 stage. The flasks are incubated for 48 hours and then simultaneously supplemented by the addition of 0.25 ml. per flask of a solution containing 200 mgs. of 19-norprogesterone per ml. of 1:1 mixture of acetone and N,N-dimethylformamide resulting in a final 19-norprogesterone concentration of 500 gamma per ml. of broth; and 0.2 ml. per flask of an aqueous solution containing 335 mgs. per ml. of acriflavin resulting in a final hydroxyl amine concentration of about $1 \times 10^{-3}$ M. Incubation is continued for about 24 hours under the conditions used in the incubation of the F1 stage flasks.

B. Isolation: Each flask is harvested by filtration directly through a Seitz clarifying pad using suction. The filtrates are combined and thrice extracted with 700 ml. portions of chloroform and the chloroform extracts are evaporated to dryness leaving a residue which is chromatographed on a cellulose powder column by the procedure outlined in part B of Example 1. There is thus obtained by recrystallization from acetone-hexane about 98 mgs. of 9α-hydroxy-19-norprogesterone.

EXAMPLE 6

*9α-Hydroxy-Δ⁴-Androstene-3,17-Dione*

A. Fermentation: 1 ml. portions of inoculum obtained as described in Example 1 from a culture of *Cylindrocarpon radicicola* (ATCC 11,011) on Gould Agar are used to inoculate each of five 250 ml. Erlenmeyer flasks (F1 stage) each containing 50 ml. of Corn Steep Medium. The flasks are incubated at 25° on a rotary shaker (200 cycles per minute, 2 inch radius for 72 hours) after which time a 3% by volume transfer is made to each of twenty 500 ml. Erlenmeyer flasks containing 100 ml. of the medium used in the F1 stage. The flasks are incubated for 48 hours and then simultaneously supplemented by the addition of 0.25 ml. per flask of a solution containing 200 mgs. of Δ⁴-androstene-3,17-dione per ml. of 1:1 mixture of acetone and N,N-dimethylformamide resulting in a final Δ⁴-androstene-3,17-dione concentration of 500 gamma per ml. of broth; and 0.2 ml. per flask of an aqueous solution containing 50γ per ml. of antimycin A. Incubation is continued for about 24 hours under the conditions used in the incubation of the F1 stage flasks.

B. Isolation: Each flask is harvested by filtration directly through a Seitz clarifying pad using suction. The filtrates are combined and thrice extracted with 700 ml. portions of chloroform each time and the chloroform extracts are evaporated to dryness leaving a residue which is chromatographed on a cellulose powder column by the procedure outlined in part B of Example 1. There is thus obtained upon recrystallization from acetone-hexane about 100 mg. of 9α-hydroxy-Δ⁴-androstene-3,17-dione.

EXAMPLE 7

*Preparation of 9(11)-Dehydroprogesterone*

9α-hydroxyprogesterone (63 mg.) is dissolved in 1 ml. of pyridine and treated at room temperature with 0.03 ml. of thionyl chloride. After 10 minutes the solution is diluted with 10 ml. of water and the pyridine neutralized by the addition of an equivalent amount of hydrochloric acid. The resulting mixture is extracted with chloroform, the chloroform extract washed with water, dried over sodium sulfate and concentrated to dryness leaving about 75 mg. of residue which upon fractional crystallization from ethyl acetatehexane, gives 9(11)-dehydroprogesterone, M.P. about 117–118°.

In the same manner, following the procedure of Example 7, 9α-hydroxytestosterone, 9α-hydroxycortexolone, 9α-hydroxydesoxycorticosterone, 9α-hydroxy - 19,norprogesterone and 9α-hydroxy-Δ⁴-androstene-3,17-dione are converted to $\Delta^{4,9(11)}$-androstadiene-17β-ol-3-one, $\Delta^{4,9(11)}$-pregnadiene-17α,21-diol-3,20-dione, $\Delta^{4,9(11)}$-pregnadiene-21-ol-3,20-dione, 19-nor-9(11)-dehydroprogesterone and $\Delta^{4,9(11)}$androstadiene-3,17-dione, respectively.

This invention may be variously otherwise embodied within the scope of the appended claims.

What is claimed is:

1. A process for 9α-hydroxylating steroids which comprises subjecting a 9-unsubstituted-steroid to the combined action of enzymes of a $\Delta^1$-dehydrogenating microorganism and an agent which inhibits $\Delta^1$-dehydrogenation under oxidizing conditions, said agent being selected from the group consisting of compounds which when added to a system containing cytochrome oxidase prevent the conversion of the cytochrome oxidase to its activated form and compounds which when added to a system containing succinic acid and succinic dehydrogenase prevent the conversion of the succinic acid to fumaric acid.

2. The process of claim 1 wherein the $\Delta^1$-dehydrogenating microorganism is a 1-dehydrogenating species selected from the genera consisting of Nocardia, Pseudomonas, Corynebacterium, Mycobacterium, and Cylindrocarpon.

3. The process for the preparation of 9α-hydroxyprogesterone which comprises subjecting progesterone under oxidizing conditions, to the combined action of a cyanide metal salt and the enzymes of *Nocardia restrictus*.

4. The process for the preparation of 9α-hydroxycortexolone which comprises subjecting cortexolone, under oxidizing conditions, to the combined action of hydroxylamine and the enzymes of *Nocardia aurentia*.

5. A process for 9α-hydroxylating steroids which comprises subjecting a 9-unsubstituted steroid to the combined action of enzymes of a $\Delta^1$-dehydrogenating microorganism and an inhibitor selected from the group consisting of hydrazine, hydrogen sulfide, cyanide metal salts, azide metal salts, carbon monoxide, ammonia, hydroxylamine, antimycin A, atebrin, acriflavin and quinine.

References Cited in the file of this patent

UNITED STATES PATENTS

| | | |
|---|---|---|
| 2,732,383 | Beonstein | Jan. 24, 1956 |
| 2,734,907 | Levin | Feb. 14, 1956 |
| 2,837,464 | Nobile | June 3, 1958 |
| 2,903,398 | Kita et al. | Sept. 8, 1959 |